United States Patent Office 3,421,390
Patented Jan. 14, 1969

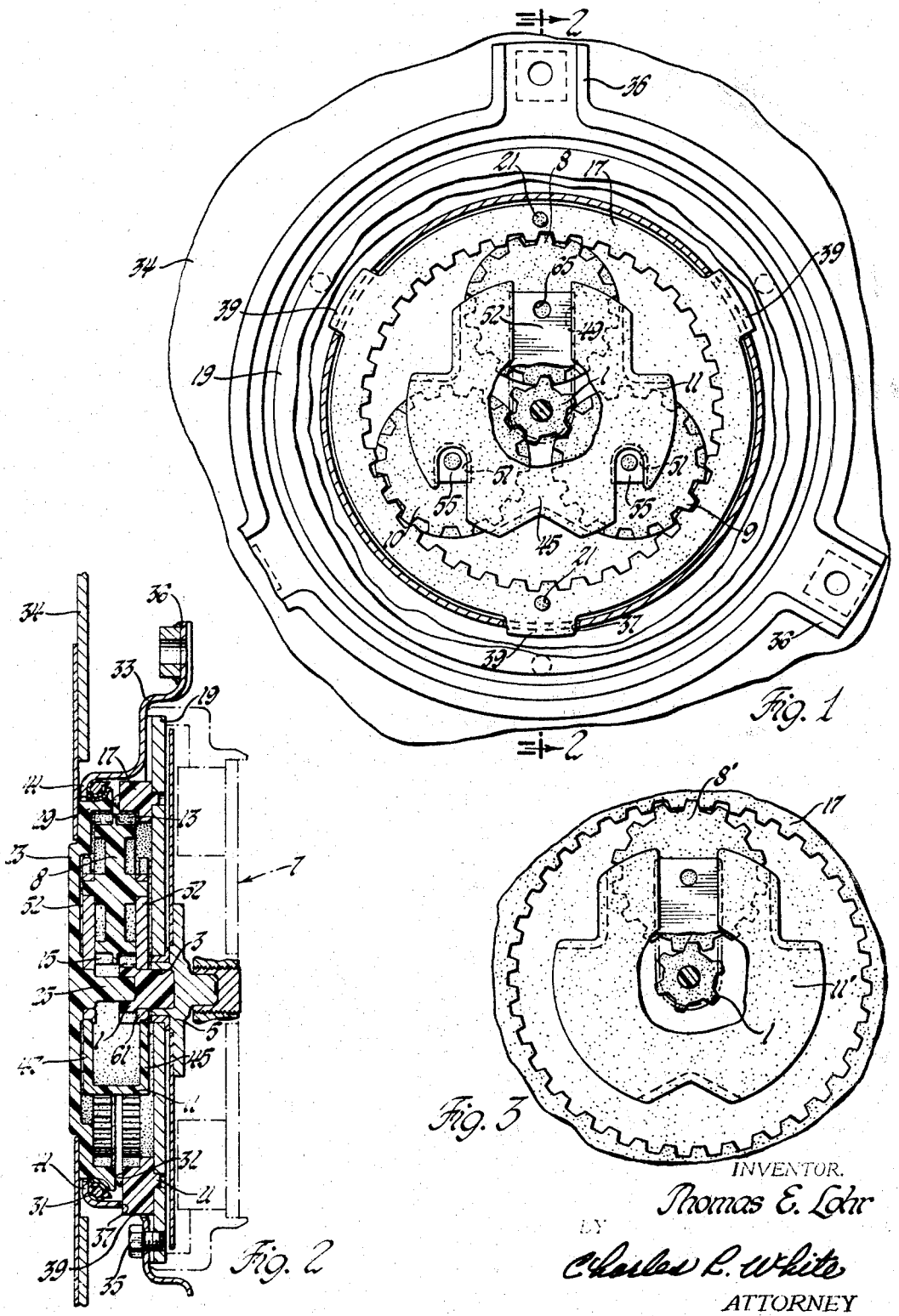

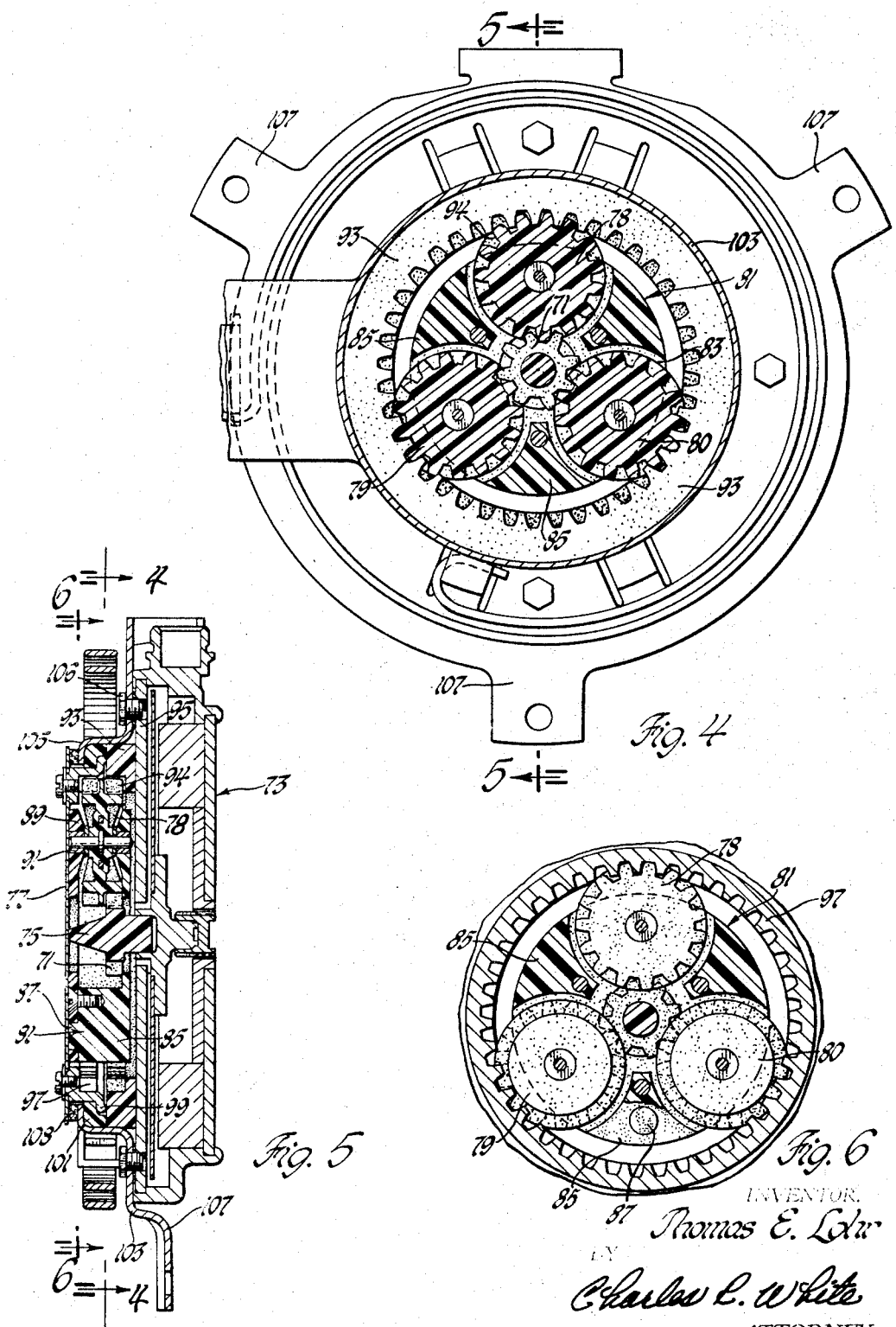

3,421,390
POWER TRANSMISSION
Thomas E. Lohr, Warren, Mich., assignor to General Motors Corporation, Detroit, Mich., a corporation of Delaware
Filed Aug. 25, 1966, Ser. No. 575,067
U.S. Cl. 74—801     10 Claims
Int. Cl. F16h 1/32

ABSTRACT OF THE DISCLOSURE

In the preferred embodiment, the planetary gear unit has a one-piece carrier with spaced sides having slots which receive the bearings for the planet gears, the input sun gear and the output ring gear. The output ring gear is piloted into the input sun gear and peripherally engages an annular thrust bearing and seal mounted in an outer cover member. A ring gear which meshes with the planet gears is fixed to a face plate to provide the reaction for conditioning the gear unit for a predetermined speed ratio.

---

This invention relates in general to power transmissions and in particular to a compact, planetary power train in which the parts are designed to provide for quick and easy assembly into a power train with the parts providing improved mutual support.

In one embodiment of the invention there is provided an improved compound planetary gear set having a one-piece carrier into which planetary gears may be readily installed to form an improved carrier assembly. There is also featured improved support of the input and output gears to allow the effective use of only one planet gear in the power train if desired. In another embodiment of the invention a plurality of planetary gears are used for combined support of the input gear; however, the gearing of selected planet gears is simplified to facilitate the assembly of the parts into the gear train. In the embodiments an improved thrust bearing arrangement is provided to take the axial thrust of the gear train elements when driven and to efficiently add to the support of these elements.

One object of this invention is to provide an improved transmission construction in which the parts thereof are designed to facilitate their assembly into an operative power train.

Another object of this invention is to provide a compact, planetary gear train including a single planetary power transmitting gear.

Another object of this invention is to provide an improved planetary carrier assembly for a planetary gear set in which the planets are mounted between spaced, enlarged bearing members which are laterally inserted into the carrier to form the assembly.

Another object of this invention is to provide a planetary-type drive train in which there is featured alignment between the input gear and output gear and improved support of the input gear.

Another object of this invention is to provide an improved power train having a cover which forms a bearing and support for an output gear.

These and other objects of the invention will become more apparent from the following detailed description and drawings in which:

FIGURE 1 is a front view of a first embodiment of the invention with parts broken away;

FIGURE 2 is a view taken along line 2—2 of FIGURE 1;

FIGURE 3 is a sectional view similar to the view of FIGURE 1 showing another embodiment of the invention;

FIGURE 4 is a front view partly in section of a third embodiment of the invention taken along line 4—4 of FIG. 5;

FIGURE 5 is a view taken along line 5—5 of FIGURE 4;

FIGURE 6 is a view taken along line 6—6 of FIGURE 5.

Turning now to FIGURES 1 and 2, there is shown an input sun gear 1 having a projecting shaft 3 splined or keyed to output 5 of motor 7. The sun gear drives planets or pinions 8, 9 and 10 which are mounted for rotation in a floating carrier 11. Each of the pinions is a dual gear having adjacent sets of helical gear teeth 13 and 15. The teeth 13 mesh with the helical teeth of the sun gear and a reaction ring gear 17 which is fixed to an annular face plate 19 of the motor by projections 21 which extend from the ring gear into corresponding openings formed in the plate. The teeth 15 mesh with the helical teeth of an output ring gear 23. This ring gear is generally cup shaped but has a central projecting shaft 25 which is piloted into the end of the sun gear 1 to provide an alignment and support feature. This ring gear also has an outwardly flaring rim portion 29 to accommodate an annular O-ring seal and bearing 31 and further has a flat bearing face which contacts the projecting annular bearing 32 formed on the side of the ring gear 17.

There is a cover 33 provided for this gear train which has an annular central cutout to accommodate a portion of the output ring gear which extends therethrough as shown in FIGURE 2. This allows an output element 34 to be secured thereto by suitable fastening means. The cover is secured to the plate 19 by fasteners 35 and is formed with radially-extending tab portions 36 having openings therein to receive supporting fasteners not illustrated. The annular side wall of the cover is cut away at 37 to receive the radially-projecting tabs 39, formed on the periphery of the ring gear 17, which serves to secure the ring gear to the cover. The cover also has an inwardly-turned annular lip portion 41 to retain the O-ring in position.

In this embodiment of the invention, the carrier 11 is a one-piece member having spaced side portions 45 and 47 which are formed with recesses 49 and 51 to accommodate the flat insert bearings 52 and 55. These bearings are individually shaped to conform to recesses 49 and 51 and are formed with peripheral grooves or have flanges, illustrated as flange 61, so that they may be retained by the portions of the carrier which define the recesses. Each bearing 52 is formed with an enlarged opening near one end to accommodate the sun gear 1 or the projecting shaft 25 of the output ring gear as illustrated in FIGURE 2. Also, there are spaced smaller openings 65 near the other end to accommodate the pivot shafts of the planet 8. The smaller bearings 55 have similar openings to accommodate the pivot shafts of the other planet gears.

In construction, any suitable material may be used to form the invention. However, important advantages are obtained by utilizing bearing grade plastic materials of acetal or nylon resins such as Delrin or Zytel for the gears, carrier, bearings and O-ring member. For example, the one-piece carrier and gears may be injection molded, simplifying and facilitating manufacture. Furthermore, the flexibility of parts enhances assembly. Also, due to the nature of these materials, a smooth running gear train is provided and little or no lubricant is required.

The gear train described above can be made to provide a selected high reduction ratio. For example, the input sun gear can have 9 teeth meshing with 15 teeth on the planet which engages a 39-tooth reaction ring gear. The planets also may have a 16-tooth set engaging a 42-tooth output ring gear. With such a selection of gear teeth, a high reduction ratio of 560 to 1 will be provided.

To assemble, the reaction ring gear can be quickly snapped onto plate 19, the sun gear and planets can be inserted in the bearings and the bearings may be readily installed into the carrier to provide the carrier assembly. The carrier assembly is then added into the gear train by simply inserting the shaft 3 of the sun gear into the motor output and meshing teeth 13 with the teeth of the reaction ring gear. The output ring gear may then be placed on the gear train. The O-ring seal and bearing is then added and the cover plate is installed. If desired, other installation sequences may be used.

With this construction the O-ring seal and bearing will take the axial thrust from the input sun gear and other driven elements of the gear train. With the sun gear splined into the output 5 of the motor, the output ring gear piloted into the sun gear, and both the sun gear and output ring gear supported by the carrier, a highly compact and stable power train is provided.

Due to the improved sun gear support, planets 9 and 10 may be eliminated leaving the gear train with only a single planet 8' mounted to the carrier 11' shown in FIGURE 3. The other parts are as in the first embodiment. This construction provides for a substantial reduction in parts further facilitating assembly and allowing the ratio to be changed by the use of other gearing if desired.

In another construction of the invention illustrated in FIGURES 4, 5 and 6, a similar type power train to those described above is utilized. In this construction there is an input sun gear 71, keyed to the output of motor 73, having an extension 75 which contacts the inner surface of plate 77 that serves as a thrust bearing. Planets 78, 79 and 80 are rotatably mounted in a cylindrical floating carrier 81 which has an end plate 83 formed with upstanding pins or lugs 85. These lugs have upstanding integral cylindrical projections 87 which fit into corresponding openings in an end plate 89. This construction permits the rapid and easy assembly of the carrier.

As shown, suitable bushings 91 are provided in the end plates to accommodate the pivot axes of the planets. There is a reaction ring gear 93 secured to the face plate 95 of the motor as in the previous embodiments. The teeth of this ring gear mesh with a first set of teeth 94 of the planets while the teeth of the output ring gear 97 mesh with the other set of teeth formed on planet 78. However, as shown in FIGURE 6, the planets 79 and 80 have only one set of teeth and these teeth engage only the reaction ring gear to provide support for the sun gear. Since there is no engagement with the output ring gear by these two planets, transmission assembly is enhanced particularly when helical teeth are utilized. The output ring gear is flanged at 99 to support an annular thrust bearing 101 which may be of a bearing grade plastic such as those mentioned above. A cup-shaped cover member 103 is installed over the gear train and has inturned flange 105 to retain the bearing 101 in the assembled position. The cover is secured to the plate 95 by fasteners 106 and has radially-extending tabs 107 with openings therein to receive fasteners not illustrated. Annular seal 108 is placed between output plate 77 and the outer face of the cover member 103 to provide for improved sealing of the transmission.

As in the previous embodiments, the drive train may be formed from the materials described in connection with the first embodiments to achieve a similar result. It will be appreciated that with this embodiment the sun gear is supported by three planets but only one of the planets is used in the power train to provide for ease of assembly. The thrust is taken by the annular bearing 101 in a manner similar to that described above in connection with FIGURES 1–3. It will further be seen that this unit has improved sealing, is highly compact and presents a low profile that is readily adaptable to use in confined spaces.

The above embodiments are illustrative of the invention whose breadth is limited only by the scope of the appended claims.

I claim:

1. In a power transmission the combination comprising an input gear member, an output gear member having a circumferential rim portion, planet gear means operatively connecting said input and output gear members, carrier means having spaced side portions for supporting said planet gear means, support means for rotatably mounting said planet gear means between said spaced side portions, reaction means engaging said planet gear means for conditioning said power transmission for a predetermined speed ratio, an outer cover member having an enlarged opening therein, said output gear member having a projecting portion which extends through said enlarged opening, and an annular bearing and seal means disposed on said rim portion of said output gear member and between said output gear member and said cover member providing a thrust bearing for said output member and a seal between said output member and said cover member.

2. The transmission defined in claim 1, wherein said carrier means for said planet gear means is a one-piece unit, each of said side portions having a recess extending inwardly from an outer edge portion thereof, said support means including bearing means shaped to generally conform with and fit into said recesses for operatively coupling said planet gear means of said carrier means.

3. The transmission defined in claim 1, and including spacer means carried by one of said side portions for spacing said side portions, said spacer means and the other of said side portion being formed with cooperating pin and hole fastener means for facilitating quick coupling of said last mentioned side portion to said spaced means.

4. The structure defined in claim 3, wherein said output gear member has an outwardly extending annular flange, said bearing and seal means being formed by a one-piece member having an internal annular shoulder portion to receive said flange.

5. In a power transmission comprising an input gear member and an output gear member, planet gear means operatively connecting said input and output gear members, carrier means having spaced side portions, said carrier means having aligned and laterally extending slot means extending from the edge of each of said side portions, bearing means for said input gear member and said planet gear means slidably positionable into said slot means to provide support for said planet gear means, said output gear means having an inwardly projecting shaft piloted into said input gear member and reaction means for conditioning said transmission for a predetermined speed ratio.

6. The transmission of claim 5, including a cover member for said transmission, a one-piece thrust bearing and seal member between said output gear member and said cover member for supporting said output gear member in said cover member, said reaction means being a reaction gear member engageable with said planet gear means, a support for said reaction gear member and means for fastening said reaction member to said support.

7. The transmission of claim 5, wherein said bearing means are formed by spaced inserts slidably mounted into said carrier, said inserts being formed with flanges to retain said inserts in said carrier, said inserts having aligned openings therein rotatably mounting said input and output gear members.

8. In a power transmission the combination comprising input and output gear members, and a grounded reaction gear member, a first planet gear member meshingly engaged with said input and output gear members and operatively connected to said reaction gear member, a second planet gear member meshingly engaged with only said input and said reaction gear members for providing support for said input gear member and a carrier for rotatably supporting first and second planet gear members.

9. The power transmission of claim 8 above and further comprising a cover member having an opening therein, said output gear member having an annular portion which projects through said opening, and annular thrust bearing means disposed between said cover member and said output member for absorbing thrust load of said output member when said input member is driven.

10. In a power transmission the combination comprising an input sun gear, an output ring gear, a plurality of planet gears operatively connecting said sun and ring gears, a one-piece carrier having spaced side portions, said side portions being formed with aligned slot means, insert bearing means positionable in said slot means for rotatably mounting said planet gears between said spaced side portions of said carrier, a face plate, a reaction ring gear fixed to said face plate and engaging said planet gears for conditioning said transmission for a speed reducing ratio when said sun gear is driven, a cover for said transmission fixed to said face plate, said cover having an enlarged opening formed therein, said output ring gear having a projecting portion which extends through said opening and having an outwardly extending rim portion disposed inside of said cover, and an annular thrust bearing and seal located on said rim portion and between said output ring gear and said cover providing a thrust bearing for said output ring gear and a seal for said transmission.

References Cited

UNITED STATES PATENTS

| | | | |
|---|---|---|---|
| 1,632,123 | 6/1927 | Else | 74—801 |
| 1,799,740 | 4/1931 | Felton | 74—801 |
| 2,401,875 | 6/1946 | Lawler | 74—801 |
| 3,081,648 | 3/1963 | Duer | 74—801 |

ARTHUR T. McKEON, *Primary Examiner.*